US007758426B2

(12) United States Patent
Song

(10) Patent No.: US 7,758,426 B2
(45) Date of Patent: Jul. 20, 2010

(54) ON-LINE GAME TOURNAMENT SYSTEM THE PRIZE MONEY OF WHICH IS DETERMINED BY THE WINNING NUMBER AND THE METHOD FOR THE SAME

(76) Inventor: Seung June Song, 402, Poongann Housing, 799-18, Guro 3(sam)-Dong Guro-Gu, Seoul (KR)

( * ) Notice: Subject to any disclaimer, the term of this patent is extended or adjusted under 35 U.S.C. 154(b) by 319 days.

(21) Appl. No.: 10/562,062

(22) PCT Filed: Jun. 25, 2004

(86) PCT No.: PCT/KR2004/001555

§ 371 (c)(1),
(2), (4) Date: Mar. 22, 2007

(87) PCT Pub. No.: WO2004/114188

PCT Pub. Date: Dec. 29, 2004

(65) Prior Publication Data

US 2007/0270210 A1 Nov. 22, 2007

(30) Foreign Application Priority Data

Jun. 26, 2003 (KR) ..................... 10-2003-0041959

(51) Int. Cl.
*A63F 13/00* (2006.01)
*A63F 9/24* (2006.01)

(52) U.S. Cl. ............................. 463/42; 463/16; 463/20; 463/25; 463/29; 463/40; 463/41

(58) Field of Classification Search .................. 463/42, 463/16, 20, 25, 29
See application file for complete search history.

(56) References Cited

U.S. PATENT DOCUMENTS 5,593,349 A * 1/1997 Miguel et al. ................ 463/30
5,755,621 A * 5/1998 Marks et al. .................. 463/42
6,082,887 A * 7/2000 Feuer et al. .................. 700/91
6,174,237 B1 * 1/2001 Stephenson .................. 463/42
6,652,378 B2 * 11/2003 Cannon et al. ................ 463/20
7,354,345 B2 * 4/2008 Bortnik et al. ................ 463/42
2001/0004609 A1 * 6/2001 Walker et al. ................ 463/42

(Continued)

FOREIGN PATENT DOCUMENTS

JP 05-245268 A 9/1993

(Continued)

*Primary Examiner*—John M Hotaling, II
*Assistant Examiner*—Ryan Hsu
(74) *Attorney, Agent, or Firm*—Birch, Stewart, Kolasch & Birch, LLP

(57) ABSTRACT

The present invention relates to an on-line game tournament system 1000 and the method for the same which determines participant's competition by tournament and a prize money by winning number. According to the present invention, initial level and credit are bestowed to a participant who settled a participation fee and competitors for the game are determined from the participants (Step S307). Then, the game processes and if the game between the competitors concludes, then the level of the winner is increased by one and a ratio of the credit of a loser is transferred from the loser to a winner. Also, the loser wins the prize money according to the present credit after the transfer and the participation is recorded as unavailable. (Step S314)

16 Claims, 13 Drawing Sheets

U.S. PATENT DOCUMENTS

| | | | | |
|---|---|---|---|---|
| 2002/0010025 | A1 * | 1/2002 | Kelly et al. | 463/42 |
| 2002/0115488 | A1 * | 8/2002 | Berry et al. | 463/42 |
| 2002/0142842 | A1 * | 10/2002 | Easley et al. | 463/42 |
| 2004/0142750 | A1 * | 7/2004 | Glisson et al. | 463/42 |
| 2004/0248652 | A1 * | 12/2004 | Massey et al. | 463/42 |
| 2004/0259631 | A1 * | 12/2004 | Katz et al. | 463/25 |

FOREIGN PATENT DOCUMENTS

| | | | |
|---|---|---|---|
| JP | 11-253657 | A | 9/1999 |
| JP | 2002-045573 | A | 2/2002 |
| JP | 2002-119766 | A | 4/2002 |
| JP | 2002-159755 | A | 6/2002 |
| KR | 00-0012548 | A | 3/2000 |
| KR | 01-0015970 | A | 3/2001 |
| KR | 02-0050172 | A | 6/2002 |
| KR | 03-0088516 | A | 11/2003 |
| WO | WO-97/39811 | A | 10/1997 |
| WO | WO-98/00121 | A | 1/1998 |

* cited by examiner

FIG. 2

User Data base (120)

| User ID (primary key) | Name | Secret No. | Connection flag | Game-processing flag |
|---|---|---|---|---|
| | | | | |
| | | | | |
| | | | | |

Game Data base (210)

| Game ID (primary key) | Game Description | Partici-pation Fee | Credit transfer ratio | Fee ratio | Top level | Level up by compensation | Top limit level by level-up by compensation | IP address | Security number |
|---|---|---|---|---|---|---|---|---|---|
| | | | | | | | | | |
| | | | | | | | | | |
| | | | | | | | | | |

Tournament Data base (230)

| Tournament ID (primary key) | User ID | Game ID | Present level | Present credit | Participation availability flag |
|---|---|---|---|---|---|
| | | | | | |
| | | | | | |
| | | | | | |

Competition result Data base (250)

| Competition ID (primary key) | Game ID | Challenger ID | Counterpart ID | Winner ID | Total Competition money | Fee |
|---|---|---|---|---|---|---|
| | | | | | | |
| | | | | | | |
| | | | | | | |

Sponsor Data base (260)

| Sponsor ID (primary key) | Game ID | Sponsor cash |
|---|---|---|
| | | |
| | | |
| | | |

FIG. 8A

User Data base (120)

| User ID (primary key) | Name | Secret No. | Game cash | Connection flag | Game-processing flag |
|---|---|---|---|---|---|
| song2man | Song | * * * * | 1000 | Y | Y |
| song2girl | Lee | * * * * | 1000 | Y | Y |
| gameman | Kim | * * * * | 1600 | Y | N |
| goodgame | Hong | * * * * | 800 | N | N |
| oldboy | Lee | * * * * | 800 | Y | competition anteroon |
| battle | Kang | * * * * | 800 | N | N |

Game Data base (210)

| Game ID (primary key) | Game Description | Number of person for game | Partici-pation fee | Credit transfer ratio (%) | Fee ratio (%) | Top level | Level up by compen-sation | Top limit level by level-up by compensation | Winner and prize money determination | Sponsor D·B | IP address | Security number |
|---|---|---|---|---|---|---|---|---|---|---|---|---|
| 1 | Quize | 5 | 100 | 100 | 0 | 20 | N | 0 | Y | N | | |
| 2 | STAR CRAFT | 2 | 200 | 0 | 3 | 20 | N | 0 | Y | N | | |
| 3 | PADUK | 2 | 300 | 70 | 2 | 5 | Y | 2 | N | N | xx.xx:2002 | **** |
| 4 | OMOK | 2 | 400 | 60 | 5 | 10 | Y | 3 | N | N | xx.xx:2301 | **** |
| 5 | STAR CRAFT | 2 | 300 | 100 | 5 | 10 | N | 0 | N | Y | xx.xx:2301 | **** |

Tournament Data base (230)

| Tournament ID (primary key) | User ID | Game ID | Present level | Present credit | Participation availability flag |
|---|---|---|---|---|---|
| 101 | oldboy | 1 | 1 | 0 | N(defeated) |
| 102 | battle | 1 | 1 | 0 | N(defeated) |
| 103 | song2man | 1 | 1 | 200 | N(processing) |
| 104 | song2girl | 1 | 1 | 200 | N(processing) |
| 105 | gameman | 1 | 3 | 800 | Y |
| 106 | goodgame | 1 | 2 | 0 | N(defeated) |
| 107 | oldboy | 4 | 2 | 456 | Y |
| 108 | battle | 4 | 1 | 304 | N(defeated) |

Competition result Data base (250)

| Competition ID (primary key) | User ID | Total money | Cash increment | Tournament cash | Fee | Competition No. |
|---|---|---|---|---|---|---|
| 1 | oldboy | 400 | -200 | 0 | 0 | 241 |
| 2 | goodgame | 400 | 200 | 400 | 0 | 241 |
| 3 | battle | 400 | -200 | 0 | 0 | 242 |
| 4 | gameman | 400 | 200 | 400 | 0 | 242 |
| 5 | goodgame | 800 | -400 | 0 | 0 | 243 |
| 6 | gameman | 800 | 400 | 800 | 0 | 243 |
| 7 | oldboy | 800 | 80 | 480 | 24 | 246 |
| 8 | battle | 800 | -80 | 320 | 16 | 246 |

Sponsor Data base (260)

| Sponsor DB ID | Game ID | Sponsor cash |
|---|---|---|
| 1 | 5 | 500000 |

FIG. 8B

Competition anteroom Data base (240)

| Competition anteroom ID | Game ID | Level | Name | Present participants | Process |
|---|---|---|---|---|---|
| 240 | 2 | 1 | Battle in Desert | 0 | Fail |
| 241 | 2 | 1 | Quarrel | 0 | Terminated |
| 242 | 2 | 1 | Novice all | 0 | Terminated |
| 243 | 2 | 2 | Level 2 O·K | 0 | Terminated |
| 244 | 2 | 1 | Beginners | 2 | Processing |
| 245 | 2 | 2 | You want lose? | 1 | Waiting |
| 246 | 4 | 1 | OMOK | 0 | Terminated |

Winner and transfer rate determination Data base (270)

| Credit transfer ID (Primary Key) | Game ID | Rank | Credit transfer rate (%) | Fee rate(%) | Progress method |
|---|---|---|---|---|---|
| A01 | 1 | 1 | 40 | 3 | Winner |
| A02 | 1 | 2 | 40 | 3 | Winner |
| A03 | 1 | 3 | 10 | 3 | Loser |
| A04 | 1 | 4 | 10 | 3 | Loser |
| A05 | 1 | 5 | 0 | 3 | Loser |
| A06 | 2 | 1 | 100 | 3 | Winner |
| A07 | 2 | 2 | 0 | 3 | Loser |

ON-LINE GAME TOURNAMENT SYSTEM THE PRIZE MONEY OF WHICH IS DETERMINED BY THE WINNING NUMBER AND THE METHOD FOR THE SAME

FIELD OF THE INVENTION

The present invention relates to an on-line game tournament system and the method for the same which determines participant's competition by tournament and a prize money by winning number.

According to the present invention, users can participate in the on-line game tournament by paying only initial participation fee to enjoy the on-line game tournament and pay back the prize money in accordance with the winning number, the on-line game tournament which is always open and progresses its competition by the tournament.

BACKGROUND

General game contest collects its applicants through on-line or off-line, makes competition table between the applicants and progresses the contest along the competition table. This game contest is open regularly or intermittently. Also, the general game contest determines its prize money in advance in connection with the predetermined rank so that the participant whose rank is out of the predetermined rank cannot win the prize money at all.

The general game contest has the following problems.

Firstly, a certain number of applicants should be collected to make the competition table. Accordingly, people who lost applying period should wait for the next game contest. Also, the participants who are defeated very earlier also should wait for the next game contest.

Secondly, the contest progresses along the predetermined competition table so that the participants should passively take the games along the predetermined schedule. Accordingly, it may be difficult for the participants to effectively manage their time, which may reduce the enjoyment of the game.

Thirdly, the participants compete with predetermined competitors on the same level according to the competition table.

Fourthly, the prize money is won to the participants within the predetermined rank so that the participants out of the rank cannot get the prize money at all although they won in some games.

Fifthly, the prize money is predetermined and has nothing to do with the number of the applicants. The general tournament has a preliminary contest through which it picks out the number of persons corresponding to the tournament competition table. However, the participants can win only the predetermined prize money even if they passed the preliminary contest.

Sixthly, when the participant reaches the top level (that is the first rank), there is no more competition and the tournament is terminated, which means that the further continuous participation is impossible.

Therefore, an on-line game tournament is demanded which opens all times so that users can participate in at all times, enables users to choose their competitor, determines the prize money according to the winning number, increases the prize money according to the number of the applicants, and enables the participant who reaches the top level to enjoy more competition with competitor who reaches the same level thereafter.

SUMMARY OF THE INVENTION

The present invention satisfies the above demand. Accordingly, the purpose of the present invention is to provide an on-line game tournament system and the method for the same which opens all times so that users can participate in at all times, enables users to choose their competitor, determines the prize money according to the winning number, increases the prize money according to the number of the applicants, and enables the participant who reaches the top level to enjoy more competition with competitor who reaches the same level thereafter.

Accordingly, the present invention presents a method for an on-line game tournament which determines participant's competition by tournament and a prize money by winning number comprising the steps of (a) an available participant decision step for deciding whether a user connected through a communication network who selects a game is allowed to participate in a tournament for the game in accordance with a record of availability/unavailability for the tournament for the game in respect of the user; (b) a tournament participation step for recording availability and bestowing an initial level and credit for the tournament for the game in respect of the user if a participation fee is settled in connection with the user if the user is decide to be an unavailable participant in the available participant decision step; (c) a challenging competitor decision step for deciding a challenging competitors who compete with the participant for the game from the other available participants on the same level who are not processing the game; (d) a winner and loser treatment step for increasing the level of a winner by one and transferring a certain rate of credit from a loser to the winner, and deciding a prize money of the loser according to the loser's present credit after transferring a certain rate of credit from the loser to the winner and recording unavailability for the game tournament in respect of the loser, which terminates the participation if the game has processed and concluded between the competitors by accept ion of challenging request; (e) a winner participation decision step for checking whether the winner wants further participation for the tournament for the game; (f) a continuous participation step for processing procedures including the steps from (c) to (e) if the winner is checked to want the further participation in the winner participation decision step; and (g) a winner's prize money decision step for deciding a prize money of the winner according to the present credit and recording unavailability for the game tournament in respect of the winner, which terminates the participation, if the winner is checked not to want further participation in the winner participation decision step.

In the method for an on-line game tournament which determines participant's competition by tournament and a prize money by winning number, the challenging competitor decision step may comprises the steps of (a) a making challenge step for searching and displaying the other available participants who are not processing the game as a competing counterparts from the other available participants for the tournament for the game and delivering a challenge to a counterpart if one of the available participant requests the challenge to compete with the game to one of the competing counterparts; and (b) a competitor decision step for, if the counterpart accepts the challenge, deciding the challenger and the accepter as competitors for the game.

In the method for an on-line game tournament which determines participant's competition by tournament and a prize money by winning number, the challenging competitor decision step may comprises a step for searching for the participants on the same level who are not progressing the game, and randomly or successively appointing the competitor from them.

In the method for an on-line game tournament which determines participant's competition by tournament and a prize money by winning number, the winner and loser treatment step may comprises a host fee processing step for transferring a certain ratio of the credit of the winner and the loser to a tournament-host side.

In the method for an on-line game tournament which determines participant's competition by tournament and a prize money by winning number, the making challenge step may comprises the steps of (a) a same level participant decision step for deciding whether other available participants on the same level exist; (b) a same level competitor display step for searching the participants who are not processing the game from the available participants on the same level if it is decided that other available participants on the same level exist in the same level participant decision step and displaying them; and (c) a challenge delivery step for delivering the challenge to the counterpart-participant if one of the participants challenges to one from the displayed participants.

In the method for an on-line game tournament which determines participant's competition by tournament and a prize money by winning number, the winner and loser treatment step further comprises a step for deciding whether the winner reaches to a top limit level and processing the winner's prize money decision step if the level of winner is the top limit level.

The method for an on-line game tournament which determines participant's competition by tournament and a prize money by winning number further comprises the steps of (a) an upper level participant decision step for deciding whether the available participants on the upper level exist if it is decided that other available participants on the same level do not exist in the same level participant decision step; (b) an upper level participant display step for displaying the available participants on the upper level if it is decided that other available participants on the upper level exist in the upper level participant decision step; (c) a level up by compensation step for rising up the present level to the upper level corresponding to one of the displayed upper levels of the available participants on the upper level if the participant pays an amount of money corresponding to the level difference; and (d) a return step for returning to the same level participant decision step if the level is risen up in the level up by compensation step.

The method for an on-line game tournament which determines participant's competition by tournament and a prize money by winning number further comprises the steps of (a) a further participation check step for checking whether the participant want the further participation if it is decided that other available participants on the upper level do not exist in the upper level participant decision step; (b) a return step for returning to the same level participant decision step if the participant is checked to want the further participation; and (c) a return step for returning to the winner's prize money decision step if the participant is checked not to want the further participation.

The method for an on-line game tournament which determines participant's competition by tournament and a prize money by winning number further comprises a top rank display step for displaying the top rank for the participant if it is decided that other available participants on the upper level do not exist in the upper level participant decision step.

The method for an on-line game tournament which determines participant's competition by tournament and a prize money by winning number further comprises a step for deciding whether the game is allowed for the level-up by compensation if it is decided that other available participants on the upper level exist in the upper level participant decision step and processing the upper level participant display step if the game is allowed for the level-up by compensation.

The method for an on-line game tournament which determines participant's competition by tournament and a prize money by winning number further comprises a step for deciding whether the level risen up by the level-up by compensation of the participant is within allowable range and processing the level up by compensation if the level-up by compensation of the participant is within allowable range.

The method for an on-line game tournament which determines participant's competition by tournament and a prize money by winning number further comprises the steps of (a) a challenge check step for checking whether the participant requests the challenge to one from the challenging counterparts displayed in the same level competitors display step; (b) a connection check step for checking whether the counterpart to be challenged is connected to; (c) a challenge delivery step for delivering the challenge to the competing counterpart if the counterpart is connected to.

The method for an on-line game tournament which determines participant's competition by tournament and a prize money by winning number further comprises the step of delivering the challenge by another route such as E-mail or SMS if the counterparts are not connected to and returning to the same level participant decision step.

The method for an on-line game tournament which determines participant's competition by tournament and a prize money by winning number further comprises the step of displaying the games and the participation fees according to the games to the users connected through the communication network.

The method for an on-line game tournament which determines participant's competition by tournament and a prize money by winning number further comprises the step of settling the payment of the initial participation fee from a sponsor if the sponsor exist after judging whether the sponsor exist.

The method for an on-line game tournament which determines participant's competition by tournament and a prize money by winning number further comprises the steps of: (a) an upper level participant decision step for searching for the available participants on the upper level if it is decided that the participant do not want the challenge in the challenge check step; (b) an upper level participant display step for displaying the available participants on the upper level if it is decided that other available participants on the upper level exist in the upper level participant decision step; (c) a level up by compensation step for rising up the present level to the upper level corresponding to one of the displayed upper levels of the available participants on the upper level if the participant pays an amount of money corresponding to the level difference; and (d) a return step for returning to the same level participant decision step if the level is risen up in the level up by compensation step.

The method for an on-line game tournament which determines participant's competition by tournament and a prize money by winning number further comprises the steps of (a) a further participation check step for checking whether the participant want the further participation if it is decided that other available participants on the upper level do not exist in the upper level participant decision step; (b) a return step for returning to the same level participant decision step if the participant is checked to want the further participation; and (c) a return step for returning to the winner's prize money decision step if the participant is checked not to want the further participation.

The present invention also provides an on-line game tournament system connected to client computers via communication network in relation of server-client, the system comprising a tournament information storing means which records an available participation or not, present level and present credit in respect of respective tournament of each user for a particular game, a game information storing means which records a participation fee necessary for participating in the game and credit ratio transferred for a loser to a winner according to the conclusion of the game in respect of the respective game and a user information storing means which records an information whether game is processing in respect of the respective user; (a) a tournament information creation means for creating the tournament information storing means and recording available participation and an initial level and credit with respect to the user whose participation fee is paid; (b) an available participant decision means for deciding the connected user is the available participant according to the record of the tournament information storing means; (c) a competing counterpart decision means for deciding other participants one the same level who are not processing the game as competing counterparts by referring to the tournament information storing means and the user information storing means; (d) a game-processing recording means for recording on the user information storing means that the game is processing for the users of the competitors when the game is processing between them; (e) a no game-processing recording means for recording on the user information storing means that the game is not processing for the users of the competitors when the game concludes between them; (f) a winner and loser treatment means for, according to the conclusion of the competing game, transferring a ratio of the present credit in accordance with the credit ratio on the game information storing means from the loser to the winner with respect to the tournament information recording means, increasing the present level by one on the tournament information recording means with respect to the user of the winner, deciding a prize money of the loser according to the present credit on the tournament information storing means after transferring the credit from the loser to the winner and recording an unavailable participant with respect to the loser; (g) a further participation of the tournament checking means for checking whether the winner wants the further participation in the tournament; and (h) a winner's prize money decision means for deciding a prize money of the winner according to the present credit on the tournament information storing means and recording unavailability for the game tournament in respect of the winner if the winner is checked not to want the further participation in the winner participation decision step.

The on-line game tournament system connected to client computers via communication network in relation of server-client further comprises a participation fee payment decision means for deciding whether the participation fee for the game is paid in connection with the user if the user is decided not to be the available participant by the available participant decision means.

In the on-line game tournament system connected to client computers via communication network in relation of server-client, the competing counterpart decision means comprises a competing counterpart appointing means which searches for the participants on the same level who are not progressing the game and randomly or successively appoints the competitor from them.

In the on-line game tournament system connected to client computers via communication network in relation of server-client the competing counterpart decision means comprises (a) a making challenge means for searching and displaying the other available participants who are not processing the game as a competing counterparts from the other available participants for the tournament for the game and delivering a challenge to a counterpart if one of the available participant requests the challenge to compete with the game to one of the competing counterparts; and (b) a competitor decision means for, if the counterpart accepts the challenge, deciding the challenger and the accepter as competitors for the game.

In the on-line game tournament system connected to client computers via communication network in relation of server-client, the making challenge means comprises: (a) a same level participant decision means for deciding whether other available participants on the same level exist by searching the tournament information storing means; (b) a competitor search and display means for searching from the user information storing means in connection with the available participants on the same level and displaying the available participants on the same level who are not processing the game if it is decided that other available participants on the same level exist; and (c) a challenge delivery means for delivering the challenge to the counterpart-participant if one of the participants challenges to one from the displayed participants.

In the on-line game tournament system connected to client computers via communication network in relation of server-client the making challenge means comprises (a) an upper level participant decision means for deciding whether upper level and available participants exist by searching the tournament information storing means if it is decided that the other available participants on the same level do not exist; (b) an upper level and available participant display means for displaying the upper level and available participants if it is decided that the upper level and available participant exist; (c) a level-up means by compensation step for rising up the present level to the upper level corresponding to one of the displayed upper levels of the available participants on the upper level if the participant pays an amount of money corresponding to the level difference.

The present invention further provides a method for processing a game tournament connected to client computers via communication network in relation of server-client comprising the steps of a winner and loser treatment step for increasing level of a winner by one and transferring a certain ratio of credit of a loser to the winner, and deciding a prize money of the loser according to the present credit after the transfer of the credit; and a winner's prize money decision step for deciding a prize money of the winner according to the present credit if the winner terminates the participation of the tournament.

In the on-line game tournament system connected to client computers via communication network in relation of server-client, the game is provided by a separated game server and the game information storing means records a location information for the game server so that the client computers of the competitors are connected to the game server according to the location information if the competitors are decided by the competing counterpart decision means, The method for an on-line game tournament which determines participant's competition by tournament and a prize money by winning number further comprises the step of connecting the client computers of the competitors to a game server according to a location information of the game server if the competitors are decided by the challenging competitor decision step The on-line game tournament system connected to client computers via communication network in relation of server-client further comprises an exchange information storing means storing the exchange rate between cash and cash-alternative means, a payment receiving means receiving the participation fee by the cash alternative means according to the exchange rate of the exchange information storing means and prize money decision means by the cash alternative means according to the exchange of the exchange information storing means.

The on-line game tournament system connected to client computers via communication network in relation of server-client further comprises (a) a prize money of users storing means for accumulatively storing the prize money of the respective user; and (b) a means for accumulatively storing the prize money of the respective user in the user information storing means.

In the method for an on-line game tournament which determines participant's competition by tournament and a prize money by winning number, the challenging competitor decision step comprises step of taking in the participants until the number of person for the game is satisfied and decides the participants as the competitors if the selected game is related to a multiple user competing game.

In the method for an on-line game tournament which determines participant's competition by tournament and a prize money by winning number, the winner and loser treatment step comprises the step of deciding the winner and the loser and the transfer credit rate according to the rank of the conclusion of the multiple user competing game.

In the method for an on-line game tournament which determines participant's competition by tournament and a prize money by winning number, the winner and loser treatment step comprises the step of deciding the winner and the loser and the transfer credit rate according to the rank of the conclusion of the multiple user competing game by referring to a database recording the rank regarded as the winner or the loser and the transfer credit rate or calculating them from the number of the participants.

In the method for an on-line game tournament which determines participant's competition by tournament and a prize money by winning number, the multiple user competing game includes a shooting, a role playing game, an arcade game, a problem-solving game (quiz game) in which multiple users participate and a paper, rock and scissors game between multiple users.

In the method for an on-line game tournament which determines participant's competition by tournament and a prize money by winning number, the multiple user competing game is related to a game presenting a question related to an educational study in which the multiple participants figure out it.

BRIEF EXPLANATION OF DRAWINGS

FIG. 2 shows database tables according to the present invention

FIGS. 8*a* and 8*b* show another database tables according to the present invention;

DETAILED EXPLANATION OF PREFERRED EMBODIMENT

Now, the present invention will be explained with reference to the accompanying drawings.

Figure 1:
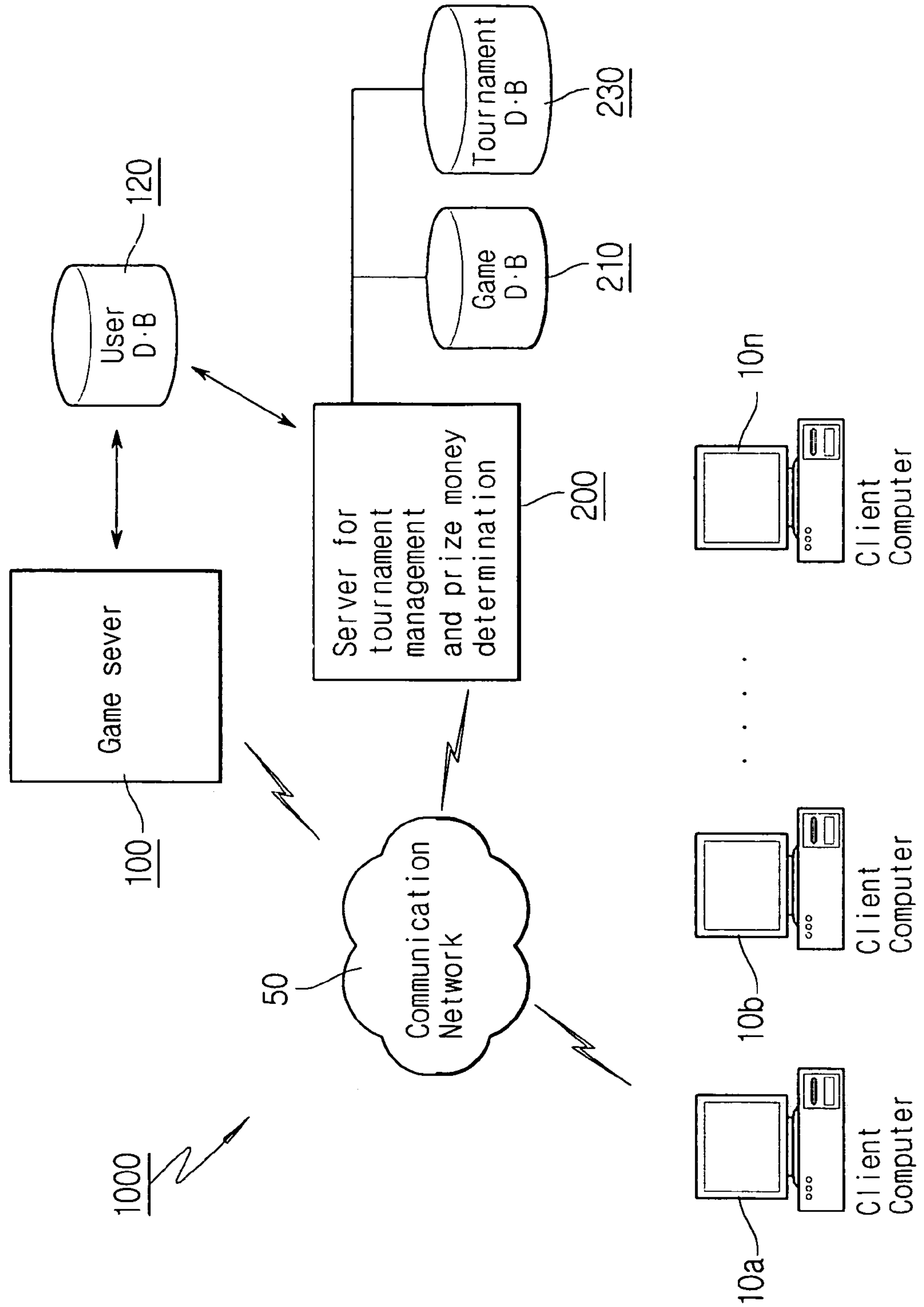
FIG. 1 shows the configuration of the present invention.

FIG. 1 shows the configuration of the on-line game tournament system 1000 according to the present invention.

The on-line game tournament system 1000 has a game server 100 and a server for tournament management and prize money determination 200.

The game server 100 provides client computers 10*a*, 10*b*, 10*c* . . . , 10*n* connected to the game server through communication network 50 with games and users of the client computers 10*a*, 10*b*, 10*c* . . . , 10*n* enjoy the games.

The server for tournament management and prize money determination 200 is connected to the client computers 10*a*, 10*b*, 10*c* . . . , 10*n* through the communication network 50 and manages the tournament according to win or defeat result of the game provided by the game server 100 and determines the prized money according to the winning number of the participant.

These servers 100 and 200 may exist physically-separated or exist as a unit. Further, it is possible to provide plural game servers 100 according to a different kind of games.

The client computers 10*a*, 10*b*, 10*c*, . . . , 10*n* are not limited to the PCs (Personal Computers) and include communication terminals such as mobile phones or PDAs which can communicate with the servers 100 and 200 through the communication network 50.

The on-line game tournament system 1000 according to the present invention has a user database 120, a game database 210 and a tournament database 230.

As shown, if the servers 100 and 200 are physically separated, the user database 120 may be shared by the servers 100 and 200. However, each of the servers 100 and 200 may have the user database 120, respectively.

FIG. 2 shows database tables according to the present invention.

The user database 120 records information about whether the game is progressing in respect of each user.

In this embodiment, the user database 120 records user information including user's name, connection flag indicating whether the user is connected, and game-progressing flag indicating whether the user is progressing the game, all of these information are recorded in respect of the each user ID.

The game database 210 records a participation fee necessary for participating in the game and credit ratio. The credit ratio determines credit which should be transferred to winner from loser as a result of the game competition.

In this embodiment, the game database 210 provides each of the games with respective ID and records game information such as game description, the participation fee necessary for participating in the game and the credit ratio in respect of the each game ID.

Also, the game database 210 may record credit ratio transferred to a tournament-host side such as the server manager as a fee after completion of the each game.

Also, the game database 210 may record top level in respect of the each game. The top level limits the further participation of the tournament participant in the upper level if the participant reaches the top level.

Also, the game database 210 may record information about whether level-up by compensation is allowed. The level-up by compensation is that the level rises up when the participant pays an amount of money corresponding to the level difference instead of winning of the games.

Especially, if the game server 100 is physically separated, the game database 210 may record game server location information such as IP address and security information for connection such as port number and secret number.

The tournament database 230 records participation availability flag, present level, and present credit in respect of each user's tournament for a particular game.

In this embodiment, the tournament database 230 has user ID, game ID, present level, present credit and participation availability flag in respect of the each tournament ID and these fields make up one record.

In this embodiment, the respective record of the tournament database 230 is newly created when the user connected to the server 200 choose a particular game tournament and pays for it. After that, if the participant terminates the participation for the game tournament or is defeated, the participation availability flag is recorded to unavailability.

The on-line game tournament system 1000 may have competition result database 250 recording game-competition result including game (game ID), challenger and the counterpart, winner, total competition money, and fee transferred to the tournament-host side in respect of the each game.

Also, there may be a sponsor and the participation fee may be paid from the sponsor. For this, there may be a sponsor database 260 as shown.

The participation fee may be paid by cash-alternative means such as cyber money, mileage, remained SMS. In this case, there may be a credit exchange database (not shown) to exchange the cash-alternative means. Further, it is possible to pay the prize money to the participants by the cash-alternative means according to the exchange of the present credit along the credit exchange database.

Figure 3A:
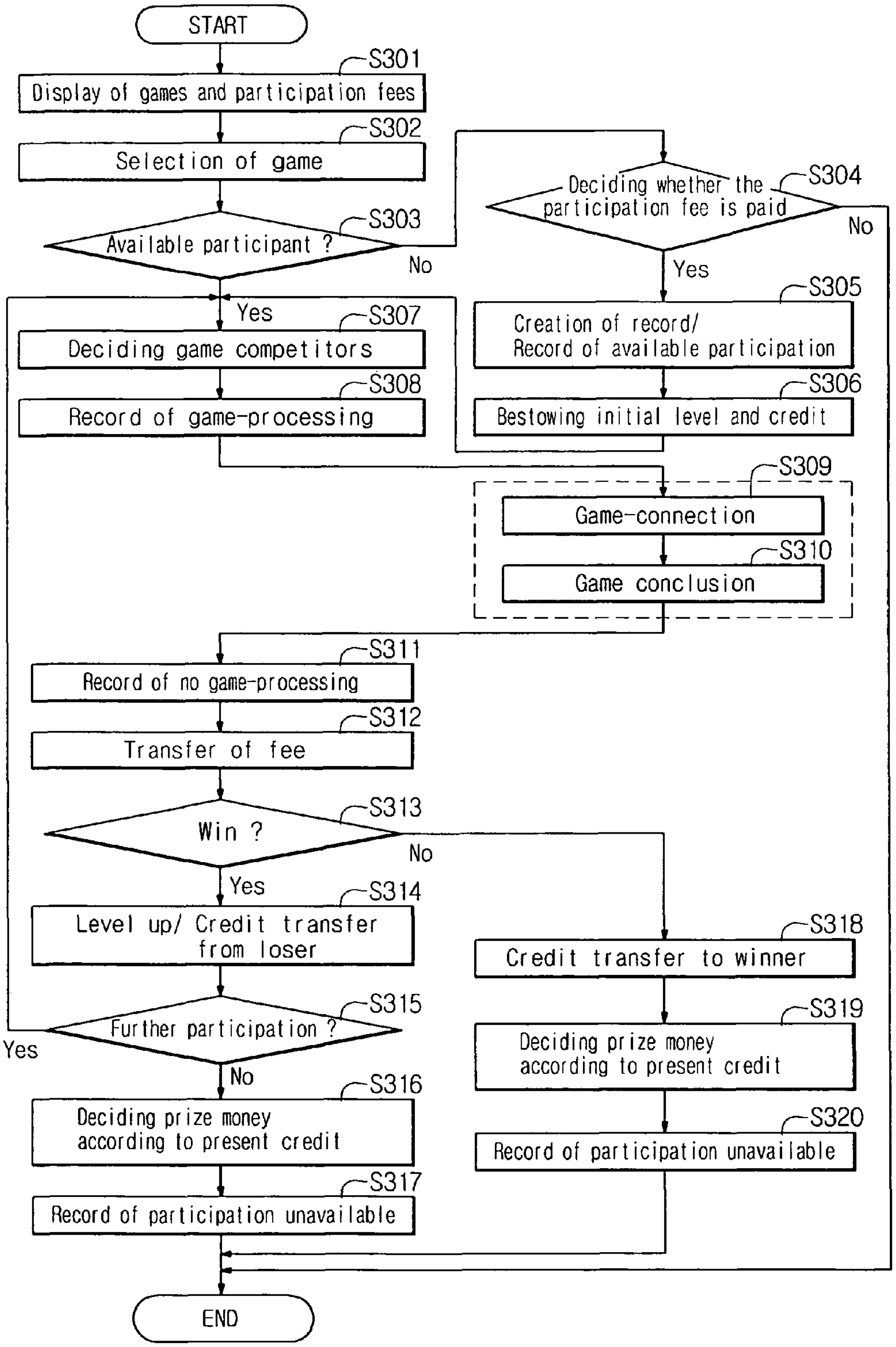
FIG. 3*a* shows the overall procedures of the present invention.

The operation of the present invention will be explained with reference to FIG. 3*a*.

Firstly, the users of the client computers 10*a*, 10*b*, 10*c*, . . . , 10*n* are recorded in the user database 120 as the user.

In this case, if the game server 100 and the server for tournament management and prize money determination 200 are separated, the users can be recorded as the user on the user database 120 via either of the severs.

Then, the server for tournament management and prize money determination 200 displays the games and the participation fees on the client computers 10*a*, 10*b*, 10*c*, . . . , 10*n* through the communication network 50. The games include checkers such as paduk. omok or chess. The participation fees are recorded on the game database 100 in respect of each of the game. (Step S301)

Then, the user of the client computers 10*a*, 10*b*, 10*c*, . . . , 10*n* selects one from the games and the server for tournament management and prize money determination 200 recognizes it. (Step S302)

Then, the server for tournament management and prize money determination 200 decides whether the users connected thereto are available participants. (Step S303) The sever for tournament management and prize money determination 200 searches the tournament database 230 for the participation availability flag of the user with respect to the game and decides that the user is available participant for the game tournament if the participation availability flag is recorded as available.

If the record on which the participation flag is recorded as available is not searched for the user with respect to the selected game from the tournament database 230, the server for tournament management and prize money determination 200 decides whether the participation fee is paid for the user. (Step S304) It is possible to provide a pay server (not shown) for which the server 200 can ask whether the user paid the participation fee. Payment server (not shown) may be integrated or separated from the server for tournament management and prize money determination 200 physically.

If the payment of the participation fee is settled for the user, the server for tournament management and prize money determination 200 creates tournament record for the user in connection with the game and records the participation availability flag as available. (Step S305)

Then, the server for tournament management and prize money determination 200 bestows the initial level and the initial credit for the user. (Step S306)

With respect to the users who are available participants, the sever for tournament management and prize money determination 200 decides game-competitors who are on the same level and are not progressing the game at present. (Step S307)

For example, the sever for tournament management and prize money determination 200 searches for the participants who are on the same level and are not progressing the game, and randomly or successively appoints the competitor from them. The server 200 searches for the users on the same level whose the participation flags are available on the tournament database 230, and searches for the users on the user database 120 who are not progressing the game at the same time. Then, the server 200 randomly or successively appoints one as the competition partner. In case of the successive appointment, it is possible to appoint the competitor along the order of the available tournament ID.

Figure 3B:
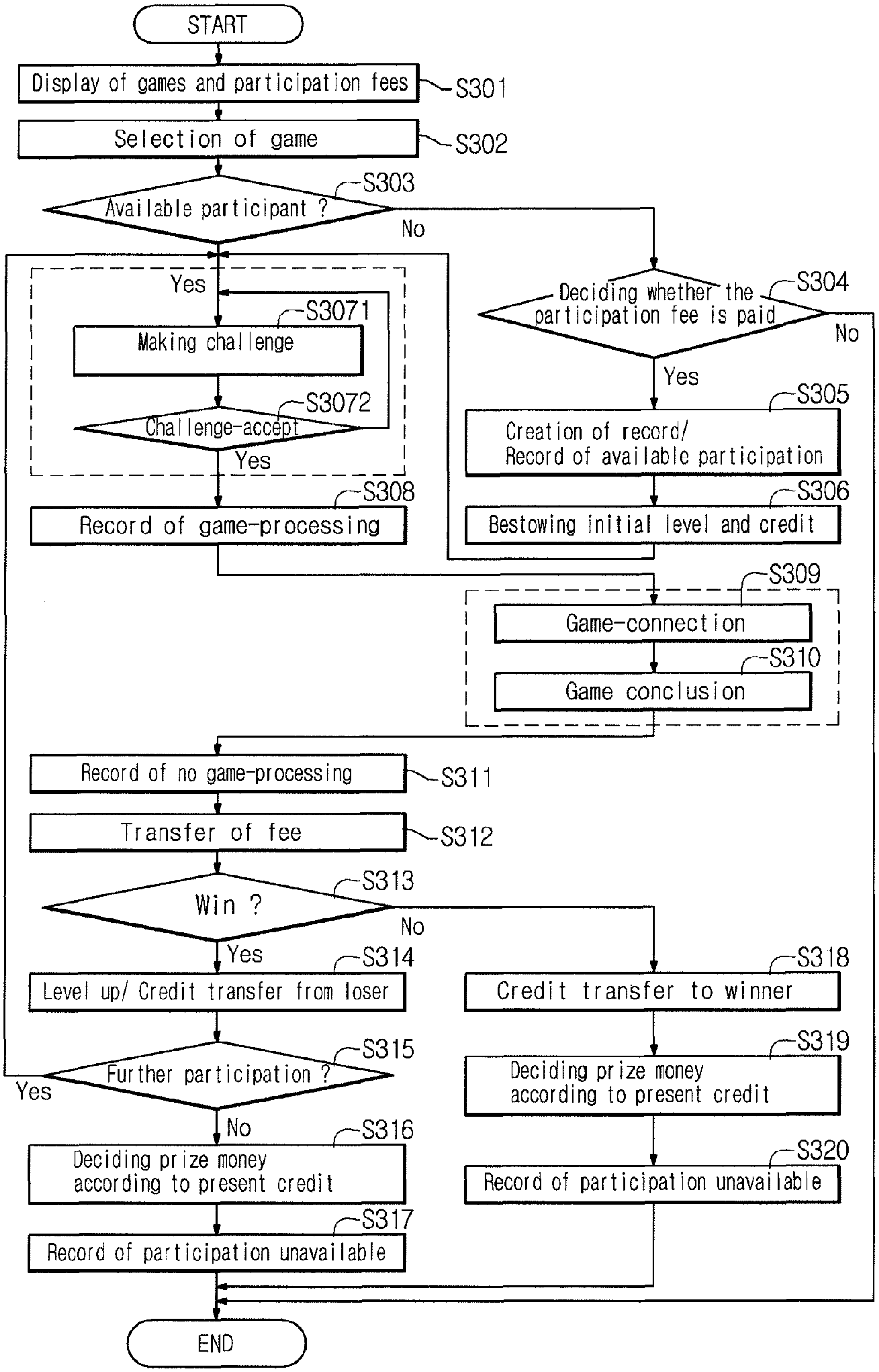
FIG. 3*b* shows an example of a competitor decision step in FIG. 3*a;*

The competitor decision step (Step S307) may include, as shown in FIG. 3*b*, a making challenge step (Step S3071) and a challenge-accept step (Step S3072).

In the making challenge step (Step S3071), the other participants who are on the same level and are not progressing the game at present are searched for and displayed as the challenging counterparts. Then, when one of the available participants challenges to one of the challenging counterparts, it is delivered to the counterpart.

In the challenge-accept step (Step S3072), the counterpart who accepts the challenge is decided as the competitor.

In this case, the server for tournament management and prize money determination 200 refers to the tournament database 230 and the user database 120 to search for other participants who are on the same level and are not progressing the game and display them as the challenging counterpart. That is, the server 200 searches for the users on the same level whose the participation availability flag are available on the tournament database 230 and users whose the game-processing flag indicates that the game is not progressing on the user database 120, and displays the users found out.

Then, when one of the available participants challenges to one of the displayed challenging counterparts, the challenge is delivered to the challenged counterpart. For example, the challenge from whom is displayed on the client computer of the challenging counterpart.

If the competitor is decided (Step S307), the information that the game is processing in respect of the respective competitors of the challenger and the counterpart is recorded. (Step S308) The game processing flags in connection with the user IDs corresponding to the competitors on the user database 120 are recorded to indicate that the game is processing.

Then, the competitors are connected to the game server 100 (Step S309) and the game progresses between the competitors and win and defeat are concluded. (Step S310)

The game server 100 may be separated from the server for tournament management and prize money determination 200. In this case, information about competitors such as user IDs and the selected game are transmitted to the game server 100 of the selected game and the competitors are connected to the selected game. If a plurality of the game servers 100 is provided according to a different kind of games, the competitor information is transmitted to the game server of the selected game and the competitors are connected to the game server 100 of the selected game.

When the game sever 100 is separated as described above, the competitors are connected to the game server 100 according to the server location information and connection security information such as port number and secret number recorded on the game database 210.

The winner and the loser are decided as the game competition concludes and the server for tournament management and prize money determination 200 gathers the result about the winner and the loser from the game server 100 if the game server 100 is separated and records that the game is not processing in connection with the competitors. The game processing flags in connection with the user IDs corresponding to the competitors on the user database 120 is recorded to indicate that the game is not processing. (Step S311)

Then, a certain ratio of the credit of the winner and the loser are transferred to the tournament-host side such as the server manager according to the host fee ratio (See the game database 210). (Step S312) It is possible to provide fee database (not shown) on which the transferred fee according to the game competition is recorded.

At this time, the completed game, the challenger and the counterpart, the winner and total game competition money along with the transferred fee may be recorded on the competition result database 250. The total game competition money means the total prize money according to the present credit of the competitors.

Then, the server for tournament management and prize money determination 200 decides whether each of the competitor is the winner or the loser (Step S313), and increases level by one unit for the winner and transfers the predetermined credit (refer to credit transfer ratio on the game database in FIG. 2) from the loser to the winner (Step S314). In this case, on the tournament database 230, the present level increases and the present credit increase in connection with the winner.

Then, the server 200 checks whether the winner wants further participation in the tournament. (Step S315) For example, it may display message asking about the further participation in the tournament on the client computer of the winner. (Step S315)

If the winner wants the further participation, the step for the winner goes to the competitor decision step 307 and goes through the above steps.

If the winner does not want further participation in the tournament, the prize money is decided according to the present credit of the winner (Step S316), the participation availability flag is changed to unavailable (Step S317) and the participation of the winner is terminated.

With respect to the participant decided as the loser on the step S313, the server 200 transfers a certain ratio of the loser's credit to the winner (Step S318) and decides the prize money by the remained credit. (Step S319) Then, the participation availability flag is changed to unavailable and the participation of the loser is terminated. (Step S320)

It is possible to display the prize money of the winner and the loser decided according to the present credit on the client computer of the winner and the loser, respectively. Further, it is possible to pay the prize money on the actual bank account of the winner and the loser, respectively. The prize money can be in the form of cyber money, mileage, SMS as well as cash.

Also, it is possible to record the prize money on the user database 120 or to provide another prize money database (not shown) on which the prize money is recorded. Then, the user can receive the prize money according to the record. For example, the prize money may be transferred to the user's bank account.

Figure 4:
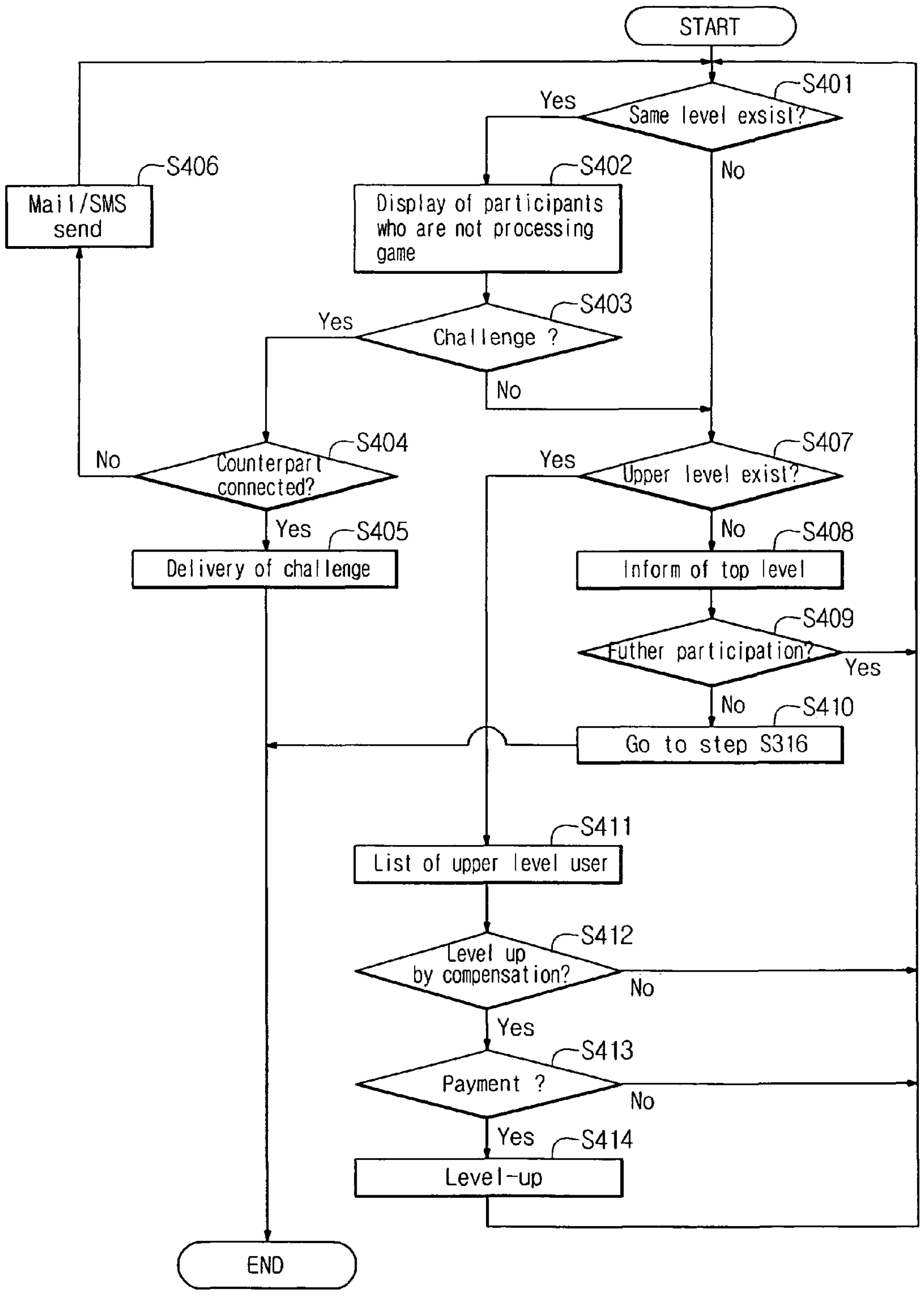
FIG. 4 shows the procedures of a making challenge step.

FIG. 4 shows the detailed flow of the making challenge step and a challenge accept step according to the steps S3071 and 3072. (See FIG. 3*b*)

Firstly, the server for tournament management and prize money determination 200 decides whether the other available participants on the same level for the game exist. (Step S401) The server 200 decides whether the users who have the same game ID and the same level exist with respect to the users whose the participation availability flag is recorded as available on the tournament database 230.

If there are available participants on the same level in connection with the corresponding game tournament, the server 200 searches for the participants who are not progressing the game among them and displays the result on the client computer of the participant seeking for the game competitor. (Step S402) The server 200 searches for the users whose the game-processing flag (refer to user database 120 in FIG. 2) indicates that the game is not progressing with respect to the same level participants and displays the result.

Then, the server 200 checks whether the available participants seeking for the game competitor want to challenge to the other available participants. (Step S403) This step is provided because the participants may wants the level-up by compensation which rises up the level by paying an amount of money corresponding to the level difference between the present level and the risen level instead of winning of the games.

If the participants want the challenge, the server 200 decides whether the counterparts are connected thereto (Step S404) and delivers the challenge to the competition counterpart if the counterparts are connected. (Step S405) If the counterparts are not connected, the challenge is delivered by another route such as E-mail or SMS and waits for the counterparts to participate in. (Step S406)

If the participants do not want the challenge, the server 200 decides whether the other participants on the upper level exist (Step S407) and, if so, displays the upper level participants and their levels. (Step S411)

Then, the server 200 checks whether the participants want the level-up by compensation (Step S412) and, if the payment of an amount of money corresponding to the level difference is settled (Step S413), rises up the level and records it on the tournament database 230. (Step S414) After that, flow goes to step S401 and server 200 decides whether the other available participants on the same risen level exist.

If the other participants on the same level are not found in the step S401, the server 200 decides whether the upper level participants exist (Step S407) and, if so, displays the participants and their level (Step S411) Then, the server 200 checks whether the participants want the level-up by compensation (Step S412) and, if the payment of an amount of money corresponding to the level difference is settled (Step S413), rises up the level and records it on the tournament database 230. (Step S414) After that, flow goes to step S401 in which the server 200 decides whether the other available participants on the same risen level exist.

If the other participants on the upper level are not found in the step S407, the server 200 displays that the participant is on the top level and checks whether he or she wants further participation in the game tournament (Step S409) If the participant want the further participation, the flow goes to step 401 and the competition will be possible when the other participants reaches the same top level.

If the participants do not want the further participation, the flow goes to step S316 and the prize money is decided according to the present credit. Then the participation availability flag is changed to unavailable (Step S317) and the participation of the winner is terminated.

If the server 200 decides whether the other participants on the same level for the corresponding game (Step S401) and judges that the other participants on the same level for the corresponding game do not exist, the server 200 processes the step S407 as shown and the processing after that is the same with the case described in connection with the step S407.

Figure 7:
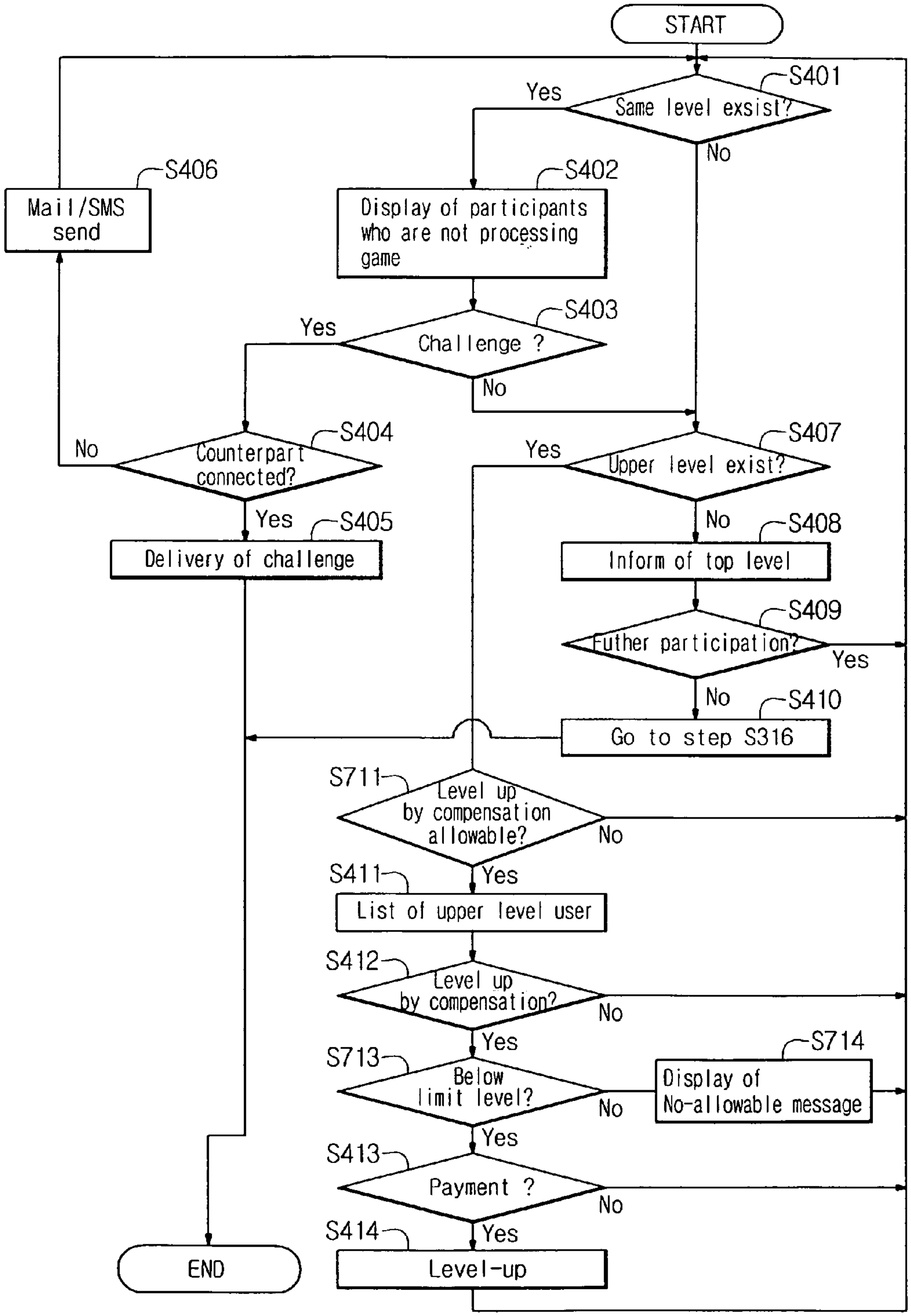
FIG. 7 shows the procedures of level-up by compensation if the level-up by compensation is limited.

According to the present invention, the level-up by compensation may not be allowed in accordance with a kind of the game. For this, the game database 210 may have a field of allowance of the level-up by compensation on which information about whether the level-up by compensation is allowed is recorded according to a kind of the game. In this case, with reference to FIG. 7, the step deciding whether the level-up by compensation is allowed is further provided (Step S711) if the participants on the same level do not exist (Step S401) and the participants on the upper level do not exist (Step S407). If the level-up by compensation is allowed, that is, the field of allowance of the level-up by compensation is recorded as allow, the next step goes to step S411 and the upper level participants are listed.

Also, the step deciding whether the level-up by compensation is allowed is provided (Step S711) if the participants on the same level exist (Step S401), the other participants on the same level are displayed (Step S402), the participant does not want the challenge (Step S403) and the other upper level participants exist. (Step S407)

If the level-up by compensation is allowed, that is, the field of allowance of the level-up by compensation is recorded as allow in connection with the corresponding game, the next step goes to step S411 and the upper level participants are listed.

According to the present invention, it is possible to define the limit of the level-up by compensation. That is, it is possible to limit the uppermost level above which the level-up by compensation is not allowed. For this, in connection with the step S412 shown in FIG. 4, step deciding whether the level the participant wants to reach by the level-up by the compensation is below the limit level may be provided. If the level the participant wants to reach by the level-up by the compensation is above the limit level, message informing that the level-up is not allowed is displayed. (Step S714)

Figure 6:
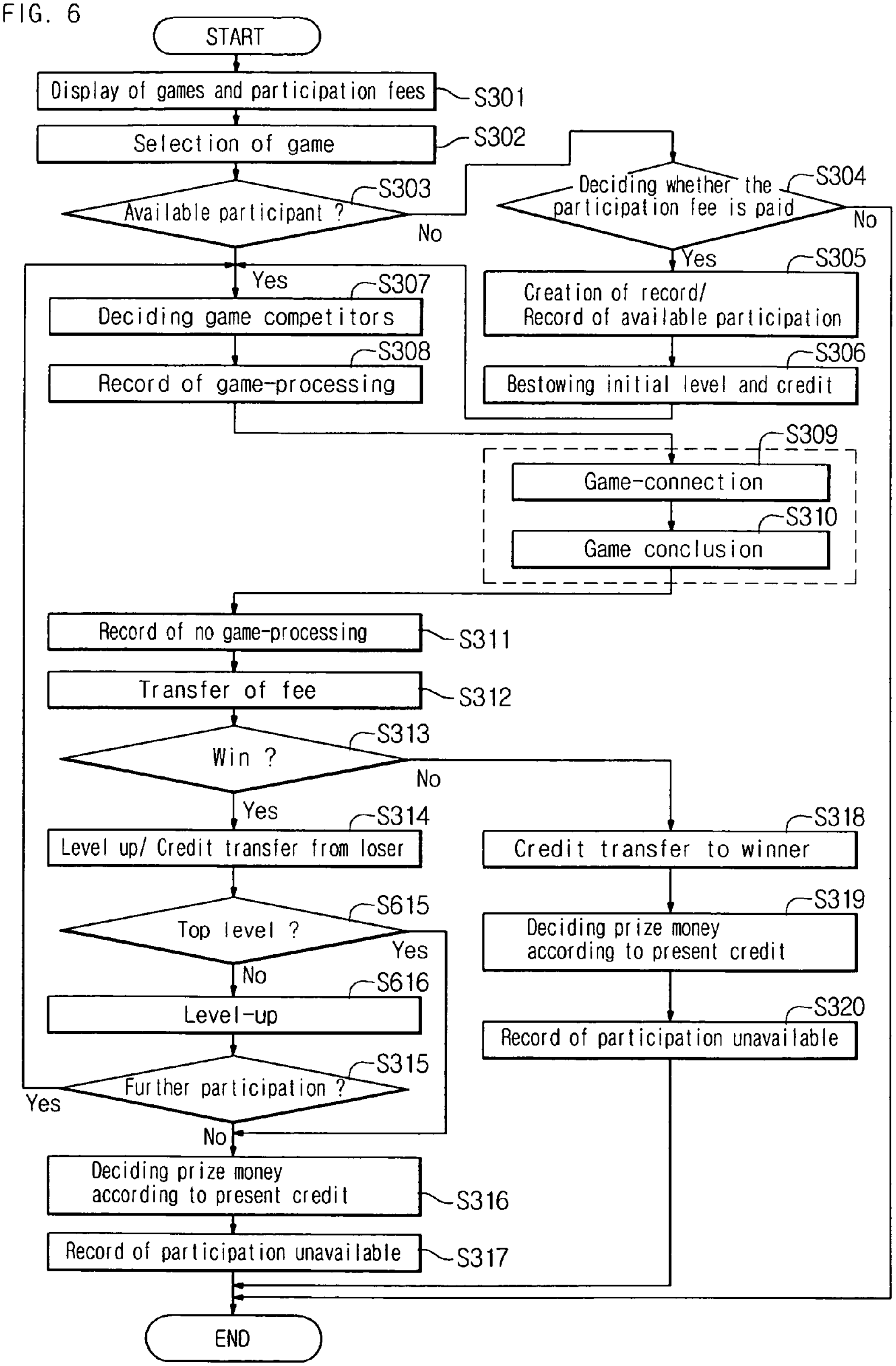
FIG. 6 shows the procedures if there is a limit for top level.

According to the present invention, it is possible to limit the top level. That is, if the participant reaches a certain level, the participant is regarded as the winner and the further game competition is terminated. Accordingly, the prize money is decided according to the present credit, the participation availability flag is changed to unavailable and the participation is terminated. For this, the game database further includes a field of top level. In this case, with reference to FIG. 6, the server for tournament management and prize money determination 200 decides whether the winner reaches the limited top level (Step S615) and allows level up if not so. (Step S616) If the winner reaches the limited top level, the prize money is decided according to the present credit (Step S316), the participation availability flag is changed to unavailable and the participation is terminated. (Step S317)

Figure 5:
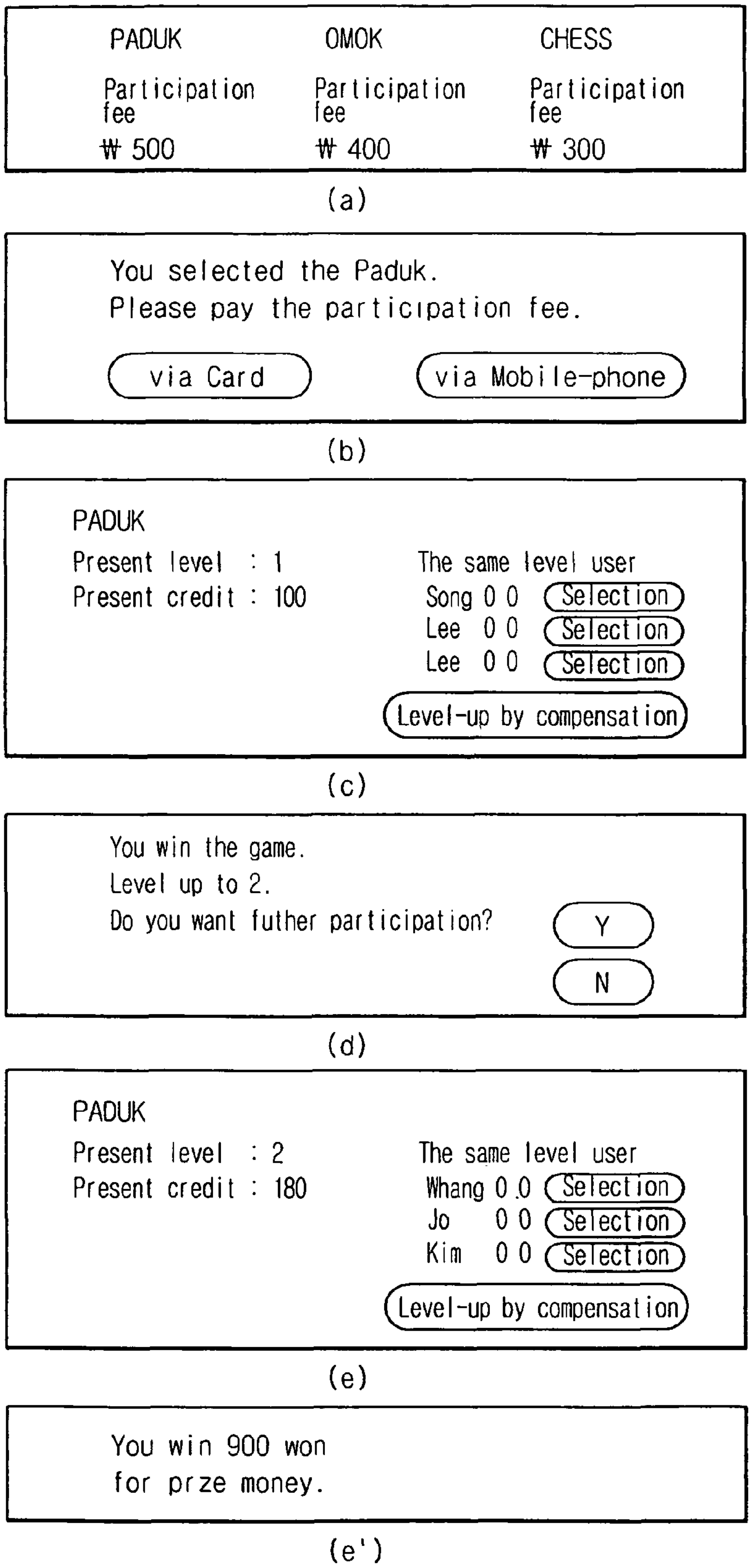
FIG. 5 shows a display on user's client computers.

FIG. 5 shows an example of the display on the user's computer according to the present invention.

Firstly, the games and their participation fees are displayed when the user is connected to the server for tournament management and prize money determination 200. (FIG. 5(*a*))

Accordingly, when the user selects one from the games, for example paduk, the server for tournament management and prize money determination 200 recognizes it and decides whether the user is the available participant and requests the payment of the participation fee if the use is not the available participant. (FIG. 5(*b*))

If the payment is settled, the initial level and the initial credit are bestowed, the record for the corresponding tournament is created and the other participants on the same level who are not processing the game are searched and the result is displayed. Accordingly, the game, the present level, present credit and the challenging counterparts on the same level are displayed on the participant's computer as shown. (FIG. 5(*c*)) The participant selects one from the challenging counterparts and requests the challenge. If the counterpart accepts the challenge, the participants and the counterpart are connected to the game server 100 and the game is processing between them. When the game concludes, the level of the winner is increased by one and some credit is transferred from the loser to the winner. Also, the winner is checked whether he or she wants the further participation. Accordingly, the increased level and the message checking the further participation are displayed. (FIG. 5(*d*))

If the winner wants the further participation, the other participants on the same level who are not processing the game are searched and the result is displayed so that the game tournament proceeds. (FIG. 5(*e*))

If the winner does not want the further participation, the prize money according to the present credit is displayed (FIG. 5(*e*')) and the participation is terminated by recording the participation availability flag as unavailable.

Further, as shown, a button for the level-up by compensation may be displayed. (FIGS. 5(*c*) and (*e*))

According to the present invention, the game is adequate if it concludes by win and defeat. Further the game may include competence between the multiple users on the network as well as one to one competence. That is, the game includes not only one to one competence game such as paduk, omok, chess and board game but also multiple user competing game such as shooting, role playing game, arcade game, problem-solving game (quiz game) in which multiple users participate and the simple game such as rock-scissors-paper between multiple users.

In connection with the multiple user competing game, the competitor decision step (Step S307) should deal with multiple competitors. Also, in this case, it is necessary to decide the winners and the losers among the multiple competitors of the participants and the credit which should be transferred from the losers to the winners. In case of the one to one competing game, when the winner and the loser are decided, the further continuation of the tournament or not and the transfer credit are decided directly. However, in case of the multiple competing game, there are only the ranks. Accordingly, there is a need for deciding the ranks within which the competitors are decided as the winners so that their level increases and out of which the competitors are decided as the losers so that their participation are terminated and the transfer credits according to the ranks.

Figure 9:
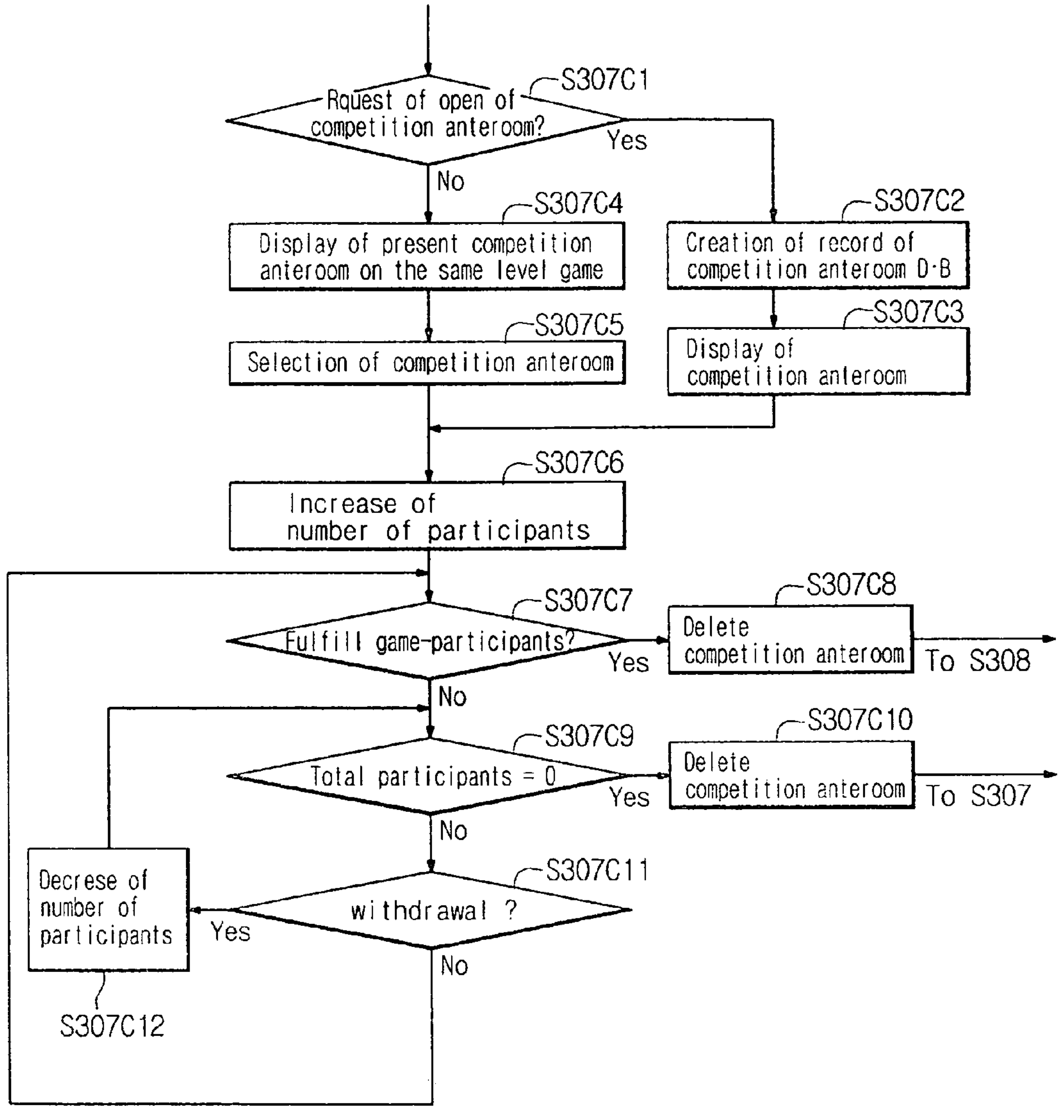
FIG. 9 shows the competitor decision step for a multiple user competing game.

FIGS. 8*a*, 8*b* and 9 show the relevant database tables and one example of the procedures.

Firstly, the game database 210 further includes a field of the number of persons for the game of multiple user competence.

Further, a competition anteroom database 240 is provided. The competition anteroom database 240 is created when one of the available participants wants the challenge and records the present number of participants in respect of the respective games. In this embodiment, the competition anteroom database 240 records game ID, the level of the game, the name of the competition anteroom, the present number of the participants and progress or not in respect of respective competition anteroom ID. The field of the progress or not indicates whether the number of persons for the game and the competence progresses.

According to the present invention, the competitor decision step (Step S307), if the game the participant selects is the multiple user competing game, takes in the participants until the number of person for the game is satisfied and decides the participants as the competitors. FIG. 9 shows one example (Step S307*c*) in this case.

Firstly, the server for tournament management and prize money determination 200 decides whether the available participant requests the open of the competition anteroom. (Step S307C1) For example, the server for tournament management and prize money determination 200 displays an icon requesting the open of the competition anteroom for the multiple user competing game on the client computer 10*a*, 10*b*, . . . , 10*n* and if one user clicks the button, the server recognize that the user requests the open of the competition anteroom.

If the server 200 decides that the participant requests the open of the competition anteroom, the record of the competition database 240 as shown FIG. 8*b* is created (Step S3072C) and the name of the competition anteroom is displayed. (Step S307C3)

If the server 200 decides that the participant does not requests the open of the competition anteroom, the server for tournament management and prize money determination 200 outputs the competition anterooms which exist at present in connection with the game on the same level. (Step S307C4) For example, the names of the competition anterooms in connection with the competition anteroom database 240 are listed.

If the participant selects one from the listed game competition anterooms on the same level (Step S307C5), the participants is decided as the one of the multiple competitors for the selected game and the number of the present participants increases by one. Also, if the participant creates the competition anteroom, the number of the present participants increases by one. (Step S307C6)

Then, the server for tournament management and prize money determination 200 decides whether the total participants are fulfilled of the competition anteroom (Step S307C7), removes the output of the competition anteroom if the total participants are fulfilled (Step S307C8) and records the game processing flags to indicate that the game is processing in connection with step S308.

In this case, there may be the participants who are not ready for the competition when the total participants are fulfilled. Accordingly, it is desirable to provide conversation means by which the participants talk together for the start time of the game competition and agree with the start time. Alternatively, it is possible to display a start button and the competition starts when all the participants press the button.

If the total participants are not fulfilled, the server 200 decides whether the number of the participants is 0 (Step S307C9) and removes the output of the corresponding competition anteroom if the number of the participants is 0 (Step S307C10) and returns to S307. This happens when nobody participates in the competition anteroom and the opener himself or herself withdraws from the competition anteroom.

Then the server for tournament management and prize money determination 200 decides whether there are someone who request to withdraw from the competition anteroom among the participants in the competition anteroom (Step S307C11) and decreases the number of the participants from the corresponding competition anteroom if withdrawal was proceed. (Step S307C12).

If the participants are fulfilled for the multiple-competing game so that the game progresses and concludes, the winners and the credit transfer rate should be decided. For this, in this embodiment, a winner and transfer rate decision database 270 is provided as shown in FIG. 8*b*. The winner and transfer rate decision database 270 records the winner or the loser, credit transfer rate and fee ratio according to the rank of the competition in connection with the respective multiple competing game. In this embodiment, as shown, game ID, the rank and the winner or loser according to the rank (tournament progressing way), credit transfer rate and the fee ratio are recorded in respect of the respective credit transfer rate ID. Also, it is possible to differently set the rank in which the competitor is regarded as the winner, the credit transfer rate or the fee ratio according to the level. In this case, the winner and transfer rate decision database 270 further includes a field of the level and the rank in which the competitor regarded as the winner so on may be differently recorded according to the level.

Accordingly, it is possible for the multiple competing game to decide the winner or the loser and the transfer rate by referring to the winner and transfer rate decision database 270.

According to the present invention, the credit transfer rate may be set by 0 (zero) and, in this case, the level of the winner is increased and the participation of the loser is terminated without the prize money.

As the alternative of the method deciding the rank in which the competitor is regarded as the winner and the transfer rate by referring to the database such as the winner and transfer rate decision database 270, it is possible to decide the rank and the transfer rate in such a way that a certain rate of the total participants are decided to be the winner and a certain rate of the total competing prize money are decided to be the credit which should be transferred.

According to the present invention, if the multiple competing game is related to the quiz game, the game server 100 may have a question database from which the questions are presented. Especially, it is desirable if the quiz is related to the educational study. In this case, the participants who figure out the questions win some scores accumulatively and the high scorers within predetermined rank are decided to be the winner and they enter the upper level. In this case, the present invention relates to the scholarly attainment contest and gets the educational effects.

According to the present invention, it is desirable to list the participants on the upper levels in respect of respective game among the participants on the respective game tournament. It gets much interest and attention from the users if the present level and the latest competition results of the upper level participants are displayed or if the competitions on the special establishment place for video recording, broadcasting and open to the public to view it.

INDUSTRIAL APPLICABILITY

Figure 10A:
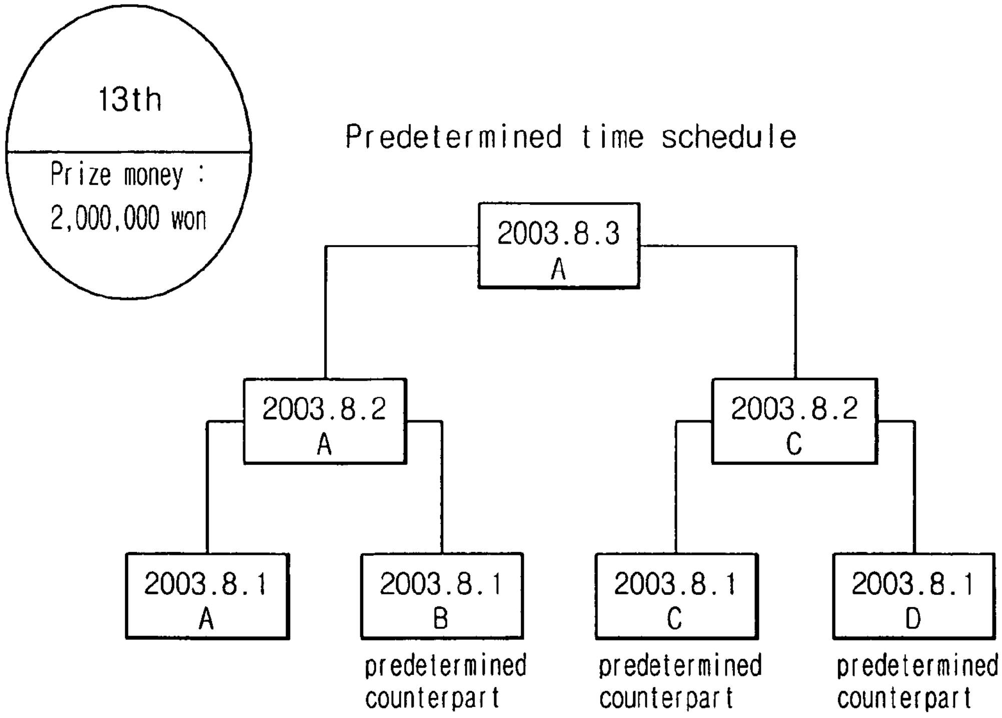
FIGS. 10*a* and 10*b* show the effect of the present invention.
Figure 10B:
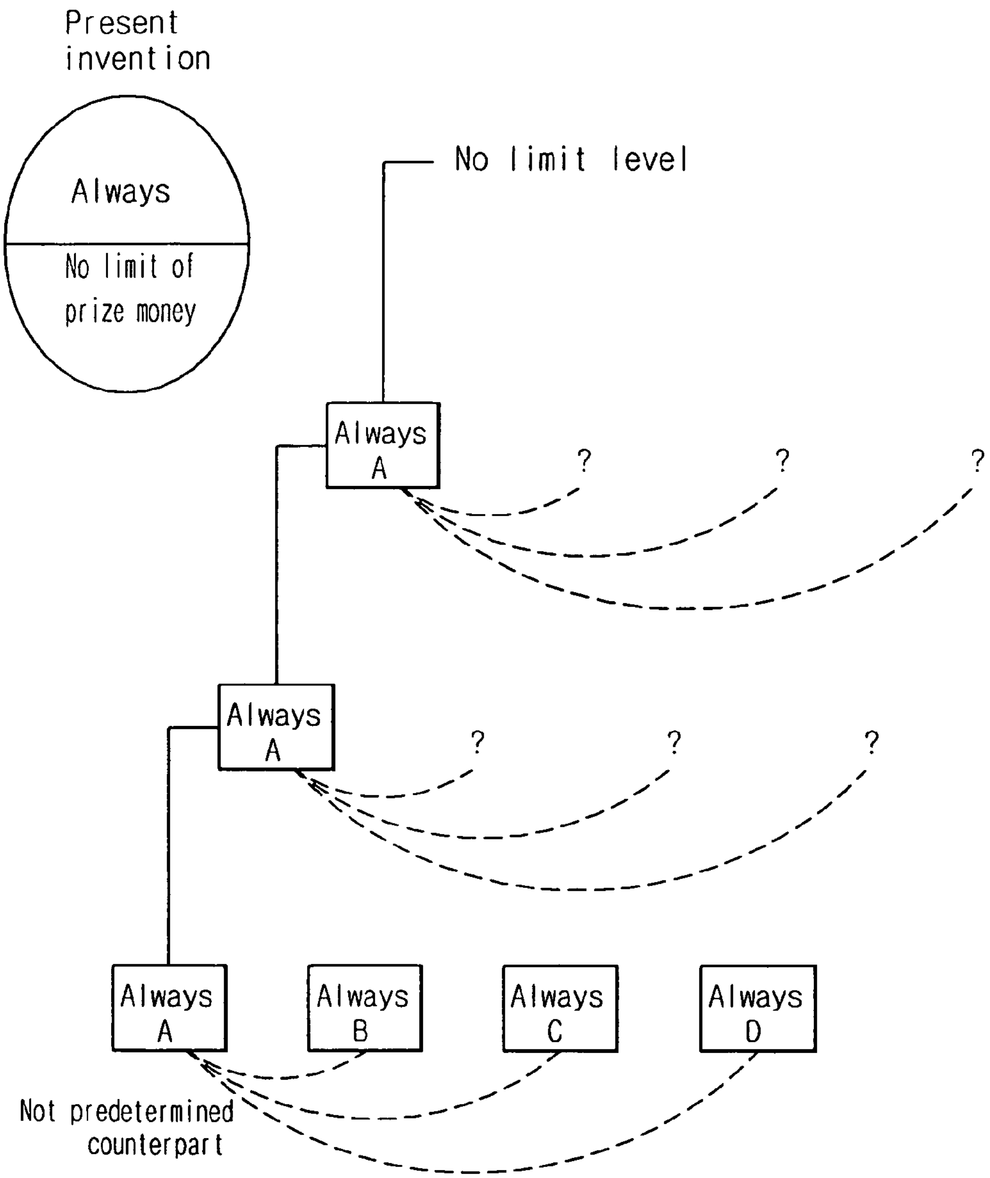

FIG. 10*a* shows the conventional game tournament and FIG. 10*b* shows the game tournament according to the present invention.

As shown, according to the present invention, the on-line game tournament is always open so that users can participate in at any time, the participants can selects the competing counterparts and win the prize money in proportional to the number of wins and the applicants and the participants who reach the top level can enjoy further competition with competitor who reaches the same level thereafter.

Also, in the present invention, the competing game may relates to the educational study and, in this case, the present invention becomes the scholarly attainment contest and gets the educational effects.

Therefore, it is understood that the purpose of the present invention is accomplished. The present invention is described with reference to the specific embodiments, but the invention is not limited there to. Only the following claims will determine the scope of the invention.

What is claimed is:

1. A method for an on-line game tournament which determines participant's competition by tournament and prize money by a winning number, the method comprising the steps of:

(a) an available tournament participation step of allowing a user connected through a communication network who selects a game to participate in a tournament for the game, recording availability for the tournament for the game in respect of the user and bestowing an initial level and an initial credit on the user for the tournament for the game, if a participation fee for the tournament for the game is paid in connection with the user;

(b) a challenging competitor decision step for deciding challenging competitors who compete with the participant for the game from the other available participants on a same level who are not processing the game, the user and a decided competitor becoming competitors for the game;

(c) a winner and loser treatment step for increasing the level of a winner by one and transferring a predetermined rate of credit from a loser to the winner, and deciding prize money of the loser according to the loser's present credit remaining after transferring the predetermined rate of credit from the loser to the winner and recording unavailability for the game tournament in respect of the loser, which terminates the participation, if the game processes and concludes between the competitors;

(d) a winner participation decision step for checking whether the winner wants further participation for the tournament for the game;

(e) a continuous participation step for processing procedures including the steps from (b) to (d) if the winner wants the further participation when checked in the winner participation decision step; and (f) a winner's prize money decision step for deciding prize money of the winner according to the present credit and recording unavailability for the game tournament in respect of the winner, which terminates the participation, if the winner does not want the further participation when checked in the winner participation decision step.

2. The method for anon-line game tournament which determines participant's competition by tournament and a prize money by winning number as recited in claim 1, wherein the winner and loser treatment step comprises a host fee processing step for transferring a certain ratio of the credit of the winner and the loser to an tournament-host side.

3. The method for anon-line game tournament which determines participant's competition by tournament and a prize money by winning number as recited in claim 1, wherein the making challenge step comprises the steps of:

(a) a same level participant decision step for deciding whether other available participants on the same level exist;

(b) a same level competitors display step for searching the participants who are not processing the game from the available participants on the same level if it is decided that other available participants on the same level exist in the same level participant decision step and displaying them; and (c) a challenge delivery step for delivering the challenge to the counterpart-participant if one of the participants challenges to one from the displayed participants.

4. The method for an on-line game tournament which determines participant's competition by tournament and a prize money by winning number as recited in claim 1, wherein the winner and loser treatment step further comprises a step for deciding whether the winner reaches to a top limit level and processing the winner's prize money decision step if the level of winner is the top limit level.

5. The method for an on-line game tournament which determines participant's competition by tournament and a prize money by winning number as recited in claim 3 further comprising the steps of:

(a) an upper level participant decision step for deciding whether the available participants on the upper level exist if it is decided that other available participants on the same level do not exist in the same level participant decision step;

(b) an upper level participant display step for displaying the available participants on the upper level if it is decided that other available participants on the upper level exist in the upper level participant decision step;

(c) a level up by compensation step for rising up the present level to the upper level corresponding to one of the displayed upper levels of the available participants on the upper level if the participant pays an amount of money corresponding to the level difference; and (d) a return step for returning to the same level participant decision step if the level is risen up in the level up by compensation step.

6. The method for an on-line game tournament which determines participant's competition by tournament and a prize money by winning number as recited in claim 5 further comprising the steps of:

(a) a further participation check step for checking whether the participant want the further participation if it is decided that other available participants on the upper level do not exist in the upper level participant decision step;

(b) a return step for returning to the same level participant decision step if the participant is checked to want the further participation; and (c) a return step for returning to the winner's prize money decision step if the participant is checked not to want the further participation.

7. The method for an on-line game tournament which determines participant's competition by tournament and a prize money by winning number as recited in claim 6 further comprising a top rank display step for displaying the top rank for the participant if it is decided that other available participants on the upper level do not exist in the upper level participant decision step.

8. The method for an on-line game tournament which determines participant's competition by tournament and a prize money by winning number as recited in claim 5 further comprising a step for deciding whether the game is allowed for the level-up by compensation if it is decided that other available participants on the upper level exist in the upper level participant decision step and processing the upper level participant display step if the game is allowed for the level-up by compensation.

9. The method for an on-line game tournament which determines participant's competition by tournament and a prize money by winning number as recited in claim 5 or 8 further comprising a step for deciding whether the level risen up by the level-up by compensation of the participant is within allowable range and processing the level up by compensation if the level-up by compensation of the participant is within allowable range.

10. The method for an on-line game tournament which determines participant's competition by tournament and a prize money by winning number as recited in claim 1 further comprising the step of settling the payment of the initial participation fee from a sponsor if the sponsor exist after judging whether the sponsor exist.

11. An on-line game tournament system connected to client computers via communication network in relation of server-client, the system having a tournament information storing means which records an availability of participation, present level and present credit in respect of a user for a particular tournament, a game information storing means which records a participation fee necessary for participating in the tournament and a credit transfer rate from a loser to a winner according to the conclusion of the game and a user information storing means which records an information whether game is processing in respect of the user, the system comprising:

(a) a tournament information creation means for creating the tournament information storing means and recording available participation and an initial level and an initial credit with respect to the user whose participation fee is paid on the tournament information storing means;

(b) an available participant decision means for deciding the user is the available participant according to the record of the tournament information storing means;

(c) a competing counterpart decision means for deciding the competing counterpart with the available participant from other available participants whose records indicate the same level and not process the game on the tournament information storing means and the user information storing means, the available participant and the decided competitor becoming the competitors for the game;

(d) a game-processing recording means for recording on the user information storing means that the game is processing for competitors when the game is processing between them;

(e) a winner and loser treatment means for transferring credit of the loser to the winner according to the credit transfer rate on the game information storing means, increasing the present level of the winner by one on the tournament information storing means, deciding a prize money of the loser according to the present credit on the tournament information storing means after transferring the credit from the loser to the winner and recording an unavailability of participation with respect to the loser on the tournament information storing means;

(f) a further tournament participation checking means for checking whether the winner wants the further participation in the tournament;

(g) a winner's prize money decision means for deciding a prize money of the winner according to the present credit on the tournament information storing means and recording unavailability of participation for the game tournament in respect of the winner if the winner does not to want the further participation.

12. The on-line game tournament system connected to client computers via communication network in relation of server-client as recited in claim 11, wherein the game is provided by a separated game server and the game information storing means records a location information for the game server so that the client computers of the competitors are connected to the game server according to the location information if the competitors are decided by the competing counterpart decision, means.

13. The on-line game tournament system connected to client computers via communication network in relation of server-client as recited in claim 11 further comprising an exchange information storing means storing the exchange rate between cash and cash-alternative means, a payment receiving means receiving the participation fee by the cash alternative means according to the exchange rate of the exchange information storing means and prize money decision means by the cash alternative means according to the exchange of the exchange information storing means.

14. The method for an on-line game tournament which determines participant's competition by tournament and a prize money by winning number as recited in claim 1, wherein the challenging competitor decision step comprises step of taking in the participants until the number of person for the game is satisfied and decides the participants as the competitors if the selected game is related to a multiple user competing game.

15. The method for an on-line game tournament which determines participant's competition by tournament and a prize money by winning number as recited in claim 14, wherein the winner and loser treatment step comprises the step of deciding the winner and the loser and the transfer credit rate based on pre-determined rule according to the rank of the conclusion of the multiple user competing game.

16. The method for anon-line game tournament which determines participant's competition by tournament and a prize money by winning number as recited in claim 15, wherein the winner and loser treatment step comprises the step of deciding the winner and the loser and the transfer credit rate according to the rank of the conclusion of the multiple user competing game by referring to a database recording the rank regarded as the winner or the loser and the transfer credit rate or calculating them from the number of the participants.

* * * * *